(12) United States Patent  
Goodman et al.

(10) Patent No.: US 8,006,013 B2  
(45) Date of Patent: Aug. 23, 2011

(54) METHOD AND APPARATUS FOR PREVENTING BUS LIVELOCK DUE TO EXCESSIVE MMIO

(75) Inventors: Benjamin Lee Goodman, Cedar Park, TX (US); Ryan Scott Haraden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/188,115

(22) Filed: Aug. 7, 2008

(65) Prior Publication Data

US 2010/0036984 A1 Feb. 11, 2010

(51) Int. Cl.
*G06F 13/00* (2006.01)
*G06F 3/00* (2006.01)

(52) U.S. Cl. .......... 710/112; 710/29; 710/107; 711/146; 719/321; 719/327

(58) Field of Classification Search ..................... 710/29; 719/321, 327
See application file for complete search history.

(56) References Cited

U.S. PATENT DOCUMENTS

| | | | |
|---|---|---|---|
| 5,758,104 A | 5/1998 | Gujral et al. | |
| 5,930,485 A * | 7/1999 | Kelly | 710/112 |
| 6,065,077 A * | 5/2000 | Fu | 710/100 |
| 6,078,981 A | 6/2000 | Hill et al. | |
| 6,108,736 A * | 8/2000 | Bell | 710/107 |
| 6,341,337 B1 | 1/2002 | Pong | |
| 6,920,516 B2 | 7/2005 | Hartwell et al. | |
| 6,968,431 B2 | 11/2005 | Mayfield | |
| 6,993,613 B2 * | 1/2006 | Connor et al. | 710/260 |
| 7,065,598 B2 * | 6/2006 | Connor et al. | 710/260 |
| 7,437,539 B2 * | 10/2008 | Abernathy et al. | 712/219 |
| 7,484,131 B2 * | 1/2009 | Fields et al. | 714/47 |
| 7,613,859 B2 * | 11/2009 | Asano et al. | 710/110 |
| 2003/0101297 A1 * | 5/2003 | Allen et al. | 710/107 |
| 2007/0118837 A1 | 5/2007 | Doing et al. | |
| 2008/0065873 A1 | 3/2008 | Hall et al. | |
| 2008/0320230 A1 * | 12/2008 | Vishin et al. | 711/141 |

* cited by examiner

*Primary Examiner* — Brian T Misiura
(74) *Attorney, Agent, or Firm* — Matthew B. Talpis; Dianoosh Salehi

(57) ABSTRACT

The disclosure relates to a method and apparatus to efficiently address livelock in a multi-processor system. In one embodiment, the disclosure is directed to a method for preventing a system bus livelock in a system having a plurality of processors communicating respectively through a plurality of bus masters to a plurality of IO Controllers across a system bus by: receiving at an MMIO state machine a plurality of snoop commands issued from the plurality of processors, identifying a first processor and a second processor from the plurality of processors, each of the first processor and the second processor having a first number of snoop commands in the input queue and a second number of responses in the output queue, the first number and the second number exceeding a threshold; issuing a burst prevention response to the first processor and the second process.

1 Claim, 2 Drawing Sheets

METHOD AND APPARATUS FOR PREVENTING BUS LIVELOCK DUE TO EXCESSIVE MMIO

BACKGROUND

1. Field of the Invention

The disclosure relates to a method and apparatus for preventing bus livelock due to excessive MMIO commands. More specifically, the disclosure relates to a method and apparatus for identifying aggressive processors issuing excessive snoop commands over a given window of time.

2. Description of Related Art

In today's symmetric multi-processor ("SMP") computers, multiple device driver threads can be executing on multiple cores concurrently. The threads can be logically contained within a single logical partition or spread across multiple logical partitions within the same physical computer. These types of computers have multiple cores, memory, and IO bridge controllers which are all connected to each other with a high speed SMP system bus. Various IO devices, such as disks, graphics adapters and network adaptors will be populated behind a single IO controller using various stages of IO hubs and bridges.

The device driver software threads will typically communicate with an IO device by executing cache inhibited memory mapped IO ("MMIO") loads and stores instructions in order to service the adapter. The MMIO load/store instructions will be issued on the system bus by an MMIO bus master and the by a command will be serviced by the particular IO Controller that owns that address range. In an SMP system, multiple partitions running multiple device drivers can run concurrently. Since multiple IO devices can be populated behind a single IO controller, each of these device driver threads, running on various partitions, can concurrently utilize a single IO controller to communicate with their respective IO device.

SMP systems typically optimize the direct memory access ("DMA") data flow for moving large amounts of data, but give less optimization for MMIO operations, which are typically used for administrative services. Device driver developers typically use MMIO commands to perform administrative services for the IO device and to setup DMA operations to move large amounts of data between memory and IO. With that said, some device drivers written for IO devices (such as 2d graphic's cards) choose to use primarily MMIO operations to update the display, instead of DMA operations. While this is not a problem in small computers with a single thread, it can become a problem in today's SMP computers if the machine is configured with multiple device driver threads communicating with multiple graphics cards behind a single IO Controller.

The reason for such problems is that the IO Controller is typically not designed to handle large amounts of MMIO streams to the same controller at the same time from multiple threads. The problem can be worse if the bus speeds used by the IO graphics cards are considerably slower then the SMP bus speed due to using older legacy PCI devices with newer/faster processors. In addition, some high performance applications such as Infiniband$^{SM}$ are moving from a DMA read/write programming model to a MMIO store/DMA write model for IO performance to cut latencies. However, these IO devices are still not as fast as the processor could issue MMIO stores and could create a constant IO bottleneck, putting added pressure on the existing IO architectures.

Although the IO Controller is not optimized for multiple MMIO bursts, it will eventually service the requests over time. If the IO Controller gets more MMIO requests on the SMP bus then it can service, it will retry the MMIO commands on the SMP bus until it can make forward progress in forwarding the commands to the IO adapter. The IO controller will attempt to service the multiple MMIO snoop requests on a first-come first-serve basis.

In an exemplary embodiment of a multi-processor system, an MMIO bus master could enter into a condition where it is constantly getting retried on the coherency bus. This condition has been called a system bus livelock. Conventional methods for dealing with a system bus livelock is limited to using a bus arbiter which implements a Linear Feedback Shift Register ("LFSR") to randomize bus grants to bus masters thereby staggering requests to the target bus. The randomization can be used to break up any livelock that may be created between two or more bus masters trying to obtain ownership of the same resource.

The conventional hang recovery mechanism helps the bus masters get out of a livelock. However, the conventional hang recovery method hurts the other threads that are not in a livelock because the bus arbiter is throttling back the bus grant rate globally. Consequently, the entire system suffers even though one or two aggressive processors may have caused the livelock. Accordingly, there is a need for a method and apparatus to for preventing bus livelock due to excessive MMIO.

SUMMARY

In one embodiment, the disclosure relates to a method for preventing a system bus livelock in a system having a plurality of processors communicating respectively through a plurality of bus masters to a plurality of IO Controllers across a system bus, the method comprising: receiving at an MMIO state machine a plurality of snoop commands issued from the plurality of processors, the state machine having an input queue and an output queue for controlling communication with the system bus; identifying a first processor and a second processor from the plurality of processors, each of the first processor and the second processor having a first number of snoop commands in the input queue and a second number of responses in the output queue, the first number and the second number exceeding a threshold; issuing a burst prevention response to the first processor and the second processor; entering into a backoff mode at each of the first processor and the second processor during the back off mode; and inserting a randomized time gap between sequential commands issued from each of the first processor and the second processor during the back off mode, the randomized gap staggered to avoid concurrent messaging from the first processor and the second processor; wherein the threshold defines a snooping command issued between each two consecutive clock cycles of the processor.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

In one embodiment, the disclosure relates to a method for localizing the random backoff mechanisms to a particular group of MMIO bus masters when the multiple MMIO bus masters over utilize a particular IO resource. The preferred embodiment does not penalize the remainder of the bus masters by putting the entire system bus into a global random backoff mode. Instead, only the aggressive bus masters are directed to a backoff mechanism.

In one implementation, the IO Controller detects that it is getting too many MMIOs within a window of time and starts driving a unique snoop response on the system bus to cause all MMIO bus masters targeting that IO controller to dynamically go into a mode where their MMIO command bus issue rate is throttled down to be no greater then a maximum programmable issue rate. The maximum programmable rate will not impact normal device driver threads, but will slow down and stagger the aggressive threads issuing the MMIOs concurrently to the same IO Controller. Once the IO Controller detects the MMIO rate is no longer a problem, it will stop driving the unique snoop response. Under this implementation, the MMIO bus masters will be able to identify the root cause for their lack of forward progress and will be able to backoff as a group.

Some MMIO bus masters may be unaware that other MMIO masters are having forward progress issues, but if they work as a group to backoff their requests to a particular IO Controller, the system will be more balanced. In one embodiment, the random backoff value can be a function of the number of potential bus masters in the system sharing an IO Controller as well as the maximum MMIO bandwidth sustainable by the IO subsystem. Each IO controller can have a programmable counter that will indicate a window of time, which is referred to as an "MMIO Burst Detection" window.

In one embodiment, the programmable window can be a multiple of the clock period of the processor and will need to be set to a value less then the SMP bus hang detection window, since the goal is to prevent the SMP bus from going into hang recovery. The window can be the time that spans between 2 one cycle pulses of a programmable counter.

Figure 1:
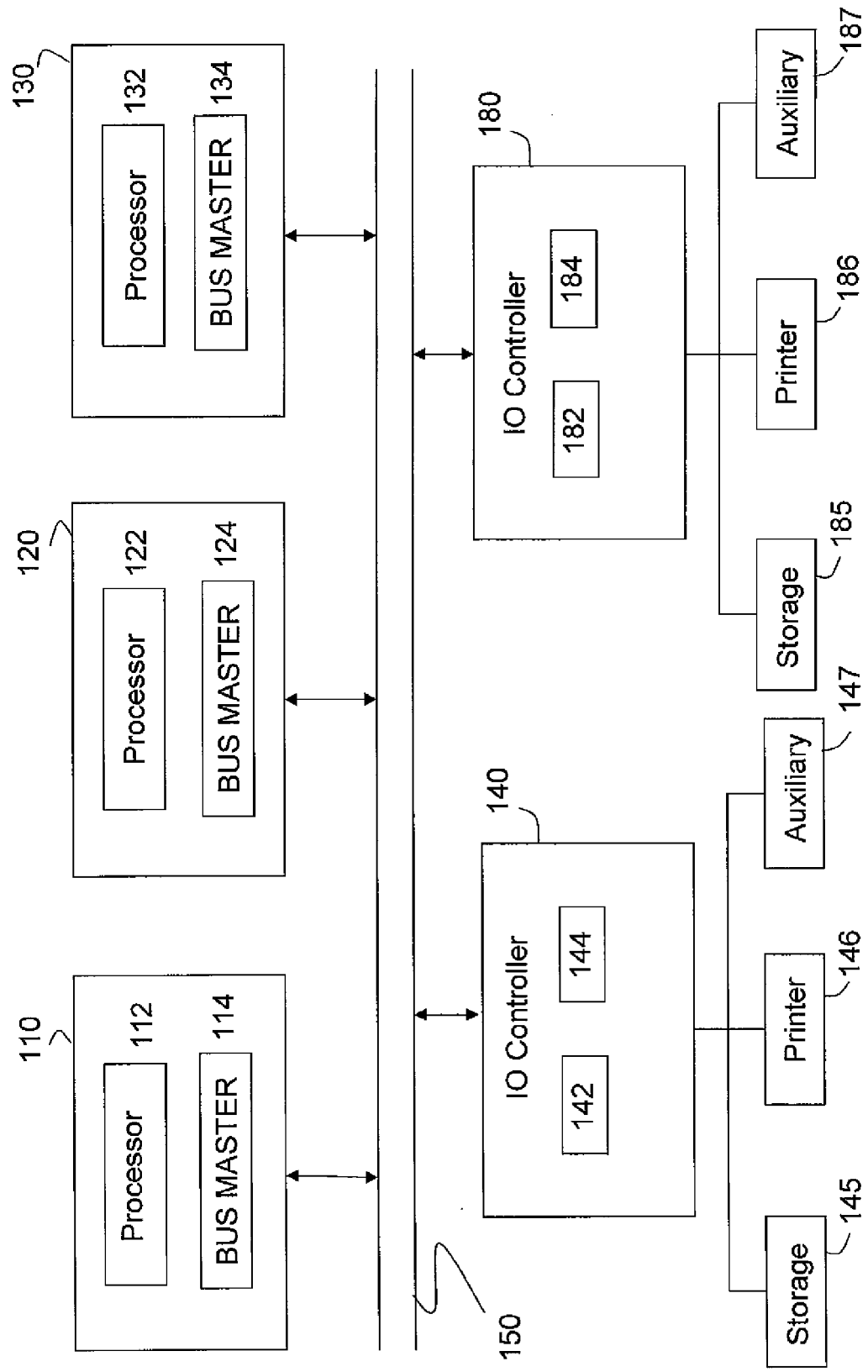
FIG. 1 is a schematic representation of SMP system implementing an embodiment of the disclosure.

FIG. 1 is a schematic representation of SMP system implementing an embodiment of the disclosure. In FIG. 1, each of nodes 110, 120 and 130 includes processor 112, 122 and 132, respectively. Within each node, the processor communicates with the peripheral devices through a dedicated bus master talking to an IO Controller across a system bus. Thus, nodes 110, 120 and 130 communicate with SMP system bus 150 through bus masters 114, 124 and 134, respectively. While not shown, each node may include cache memory and/or other local memory module accessible to the processor. SMP system bus 150 also communicates with multiple IO Controllers. For simplicity of representation, FIG. 1 only shows IO Controllers 140 and 180 although the system may have a number of IO Controllers. IO Controller 140 communicates with peripheral devices 145, 146 and 147, while IO Controller 180 communicates with peripheral devices 185, 186 and 187. The peripheral devices can comprise: printers, storage and auxiliary devices.

In one embodiment, IO Controller 140 includes 2 state machines 142 (inbound queue), 144 (outbound queue) for determining if there is a potential bottleneck problem in the MMIO queues. Similarly, IO Controller 180 includes 2 state machines 182 (inbound queue) and 184 (outbound queue). Each state machine 142, 144 (or 182, 184) may have two states: IDLE and ACTIVE. The MMIO queues will contain snoop commands/responses which are sent from or directed to nodes 110, 120 and 130. By keeping track of both the MMIO outbound store queue (MMIO out state machine 144) and the MMIO load data reply inbound (MMIO in state machine 142) queue, the IO Controller can identify the build-up of possible bottlenecks. State machines 142 and 144 can keep track and determine whether either of the inbound or outbound MMIO queues were busy, for example, for the entire time between 2 pulses of the MMIO Burst Detection counter. In one embodiment, the burst detection counter can be measured with the SMP bus clock.

The MMIO in/out state machines 142, 144 can start in the IDLE state and transition to the ACTIVE state upon seeing the first MMIO Burst Detection pulse when the respective MMIO queue is busy. If the queue ever becomes idle between the first and second MMIO Burst detection pulse, the state machine will go to the IDLE state. If the next MMIO Burst detection window pulse arrives when the state machine is in the ACTIVE state, then it can go to the MMIO burst prevention state.

If IO Controller 140 detects that either of MMIO state machines 142, 144 have entered into the MMIO burst prevention state, it will start to drive a unique snoop response, "MMIO Burst Prevention" on SMP system bus 150 for all MMIO commands that target the IO devices behind that particular IO controller (e.g., device 145, 146, 147). IO Controller 140 will continue to do this until both of the MMIO state machines exit the MMIO burst prevention state.

Upon observing the "MMIO Burst Prevention" snoop response on SMP system bus 150, the MMIO bus master state machines will transition into an MMIO backoff mode for that particular hardware thread and will stay in that backoff mode until they no longer observe the MMIO Burst Prevention snoop response. For example, if bus masters 114 and 124 receive the MMIO burst prevention snoop response, they will transition into the MMIO backoff mode as described below. In the mean time, the remaining bus masters (i.e., 134) will continue operating as before and without interruption.

While the MMIO bus masters (e.g., 114, 124) are in MMIO backoff mode, each bus master inserts randomly sized gaps between sequential MMIO commands that are issued onto SMP system bus 150 for the particular thread as long as that thread keeps observing the unique "MMIO Burst Prevention" snoop response from IO Controller 140. The gaps can be computed using an LFSR algorithm such that the MMIO commands issued in the SMP bus will be staggered randomly with respect to other bus masters issuing MMIO commands to IO Controller 180 in question.

If a thread is experiencing a "MMIO Burst Prevention" snoop response to sequential MMIO bus transactions, the thread will not have to insert the gap between bus requests if there already exists a gap larger then the desired gap. What this means is that non-aggressive threads (e.g., threads issued by bus master 134) will continue to issue MMIO requests at the normal rate, assuming there is reasonable spacing between the bus request, but aggressive threads (e.g., threads issued by bus masters 114, 124) will be slowed down. The base gaps will be programmed to be a multiple of the address to snoop response time of the SMP bus and will be a function of SMP bus frequency and IO bus frequency using a programmable LFSR based counter.

The time gaps between issuing MMIO commands on SMP bus 150 will cause the overall MMIO throughput to go down slightly for a particular thread (not enough to cause significant performance loss), but more importantly it will stagger the MMIO bursts between the various threads going to the same IO controller if the MMIO bursts happen to all line up at the same time. Such implementation allows other threads in the system to not experience system bus degradation due to IO Controller 180 getting backed-up from multiple threads issuing MMIO bursts at the same time.

The IO Controller's MMIO in/out state machines 142, 144 will exit the MMIO burst prevention state upon observing that the MMIO inbound/outbound queues are no longer busy for 2 pulses of the MMIO Burst Detection window. It should be noted that the duration of 2 pulses of the MMIO burst detection window is arbitrary and can be adjusted according the system's particularities. When both MMIO state machines 142, 144 are back in the IDLE state, IO Controller 180 may no longer drive the "MMIO Burst Prevention" snoop response. The MMIO Bus master state machines 114, 124 will still be in the backoff mode until they issue an MMIO command that does not observe the "MMIO Burst Prevention" snoop response, at which time the bus master will exit the backoff mode for that particular thread.

Figure 2:
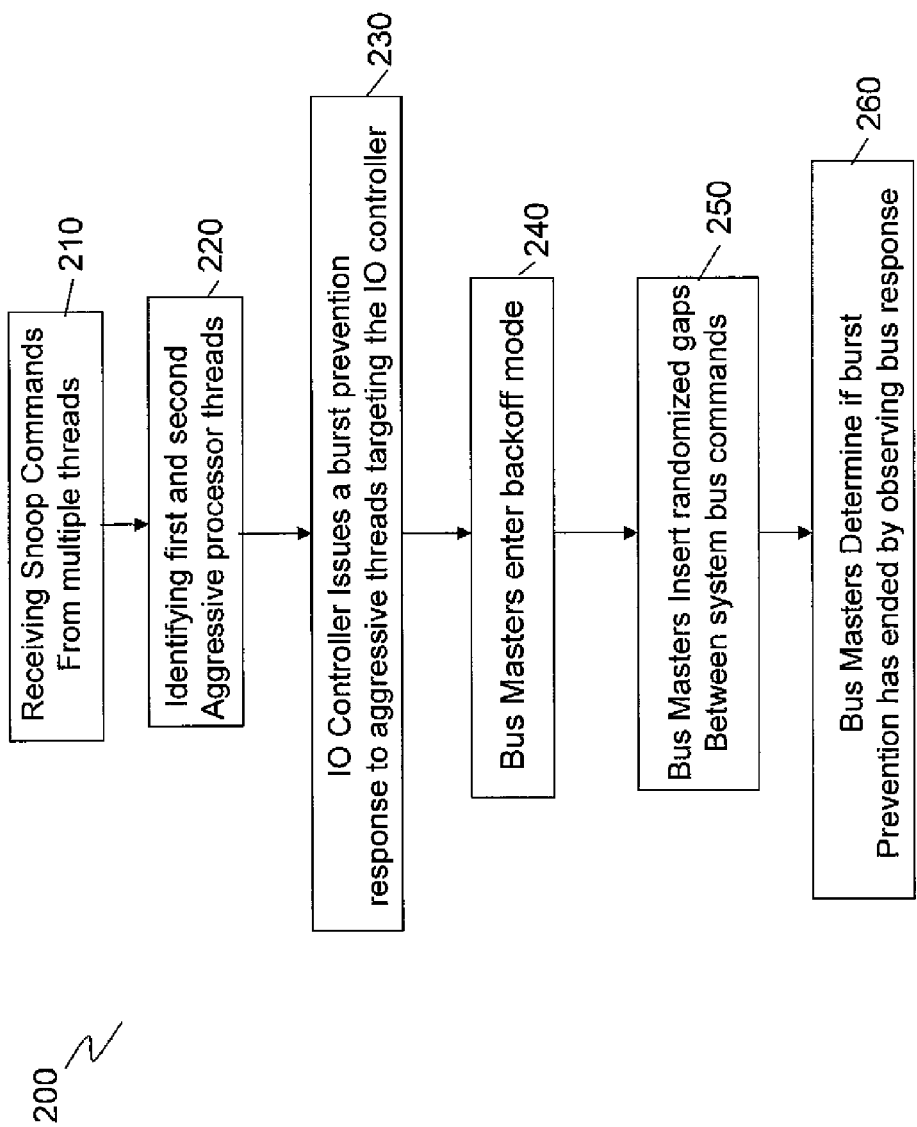
FIG. 2 is a flow diagram illustrating implementation of an embodiment of the disclosure in the SMP system of FIG. 1.

FIG. 2 is a flow diagram illustrating implementation of an embodiment of the disclosure in the SMP system of FIG. 1. Flow diagram 200 of FIG. 2 starts with 210 in which IO Controller receives snoop commands from multiple threads in the system. The IO Controller directs the received commands to an associated MMIO state machine (inbound) queue before processing. Similarly, IO Controller's responses to the snoop commands are directed to an associated MMIO state machine (outbound) queue before transmitting to SMP bus.

In step 220, the IO Controller identifies one or more aggressive threads (or processors) from among a group of threads. In one embodiment, the aggressive activity of the threads is compared against a threshold. In one exemplary embodiment, the aggressive threads are identified by determining whether one or both of the MMIO state machines have entered into the MMIO burst prevention states.

In step 230, the IO Controller issues a burst prevention response to the aggressive threads identified in step 220. The aggressive threads can include one or more threads from the plurality of threads in the system. In one embodiment, the IO controller can treat all threads that are attempting to communicate with the IO Controller the same during the MMIO burst prevention window by issuing a burst prevention response to all threads targeting the IO controller's address space. In another embodiment, IO controller can identify the aggressive threads in an order of priority. For example, a group of primary aggressive threads and a group of secondary aggressive threads may be identified by the bus id field and the IO Controller can issue a MMIO burst prevention commands for the primary aggressive threads while issuing a warning to the secondary aggressive threads.

In step 240 and upon observing the MMIO burst prevention snoop response on the SMP bus, the bus master associated with each thread will transition into an MMIO backoff mode. The backoff mode can be limited to the particular hardware thread that caused the MMIO burst prevention state.

Once entered into the backoff mode, each aggressive thread's bus master inserts a randomly sized gap between sequential MMIO commands. The gap can be computed using conventional algorithms such as an LFSR algorithm. Thus, the MMIO commands issued from the aggressive thread's MMIO bus master will be staggered randomly with respect to other aggressive threads issuing MMIO commands to the IO Controller.

The aggressive thread's MMIO Bus Master will remain in the backoff mode until it no longer observes the MMIO burst prevention snoop response. Once the MMIO Bus Master determines that the burst prevention mode has ended, it will resume normal operation as shown in step 260.

While the principles of the disclosure have been illustrated in relation to the exemplary embodiments shown herein, the principles of the disclosure are not limited thereto and include any modification, variation or permutation thereof.

What is claimed is:

1. A method for preventing livelock in a system having a plurality of processors communicating respectively through a plurality of bus masters to a plurality of IO Controllers across a system bus, the method comprising:
   a. receiving at an MMIO state machine a plurality of snoop commands issued from the plurality of processors, the state machine having an input queue and an output queue for controlling communication with the system bus;
   b. identifying a first processor and a second processor from the plurality of processors, each of the first processor and the second processor respectively having a first number of snoop commands in the input queue and a second number of responses in the output queue, the first number and the second number exceeding a threshold for each of the first processor and the second processor;
   c. issuing a burst prevention response to the first processor and the second processor;
   d. entering into a backoff mode at each of the first processor and the second processor; and
   e. inserting a randomized time gap between sequential commands issued from each of the first processor and the second processor during the backoff mode, the randomized gap staggered to avoid concurrent messaging from the first processor and the second processor;
   f. wherein the threshold defines a snooping command issued between each two consecutive clock cycles of the processor.

\* \* \* \* \*